Oct. 14, 1924.  
J. FRANKENBERG  
1,511,405  
DOMESTIC REFRIGERATING UNIT  
Filed July 1, 1920 — 8 Sheets-Sheet 3

Witness:  
Inventor  
Julius Frankenberg

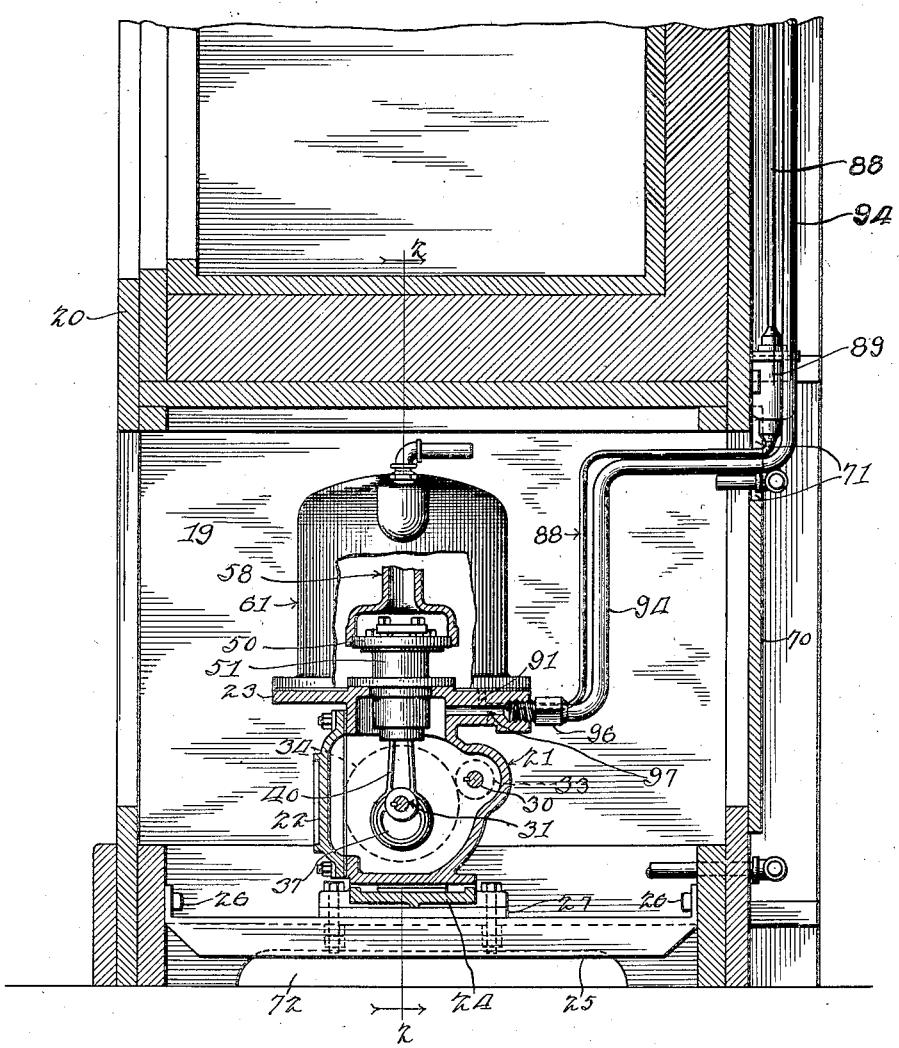

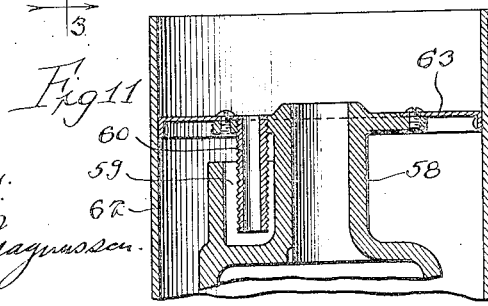

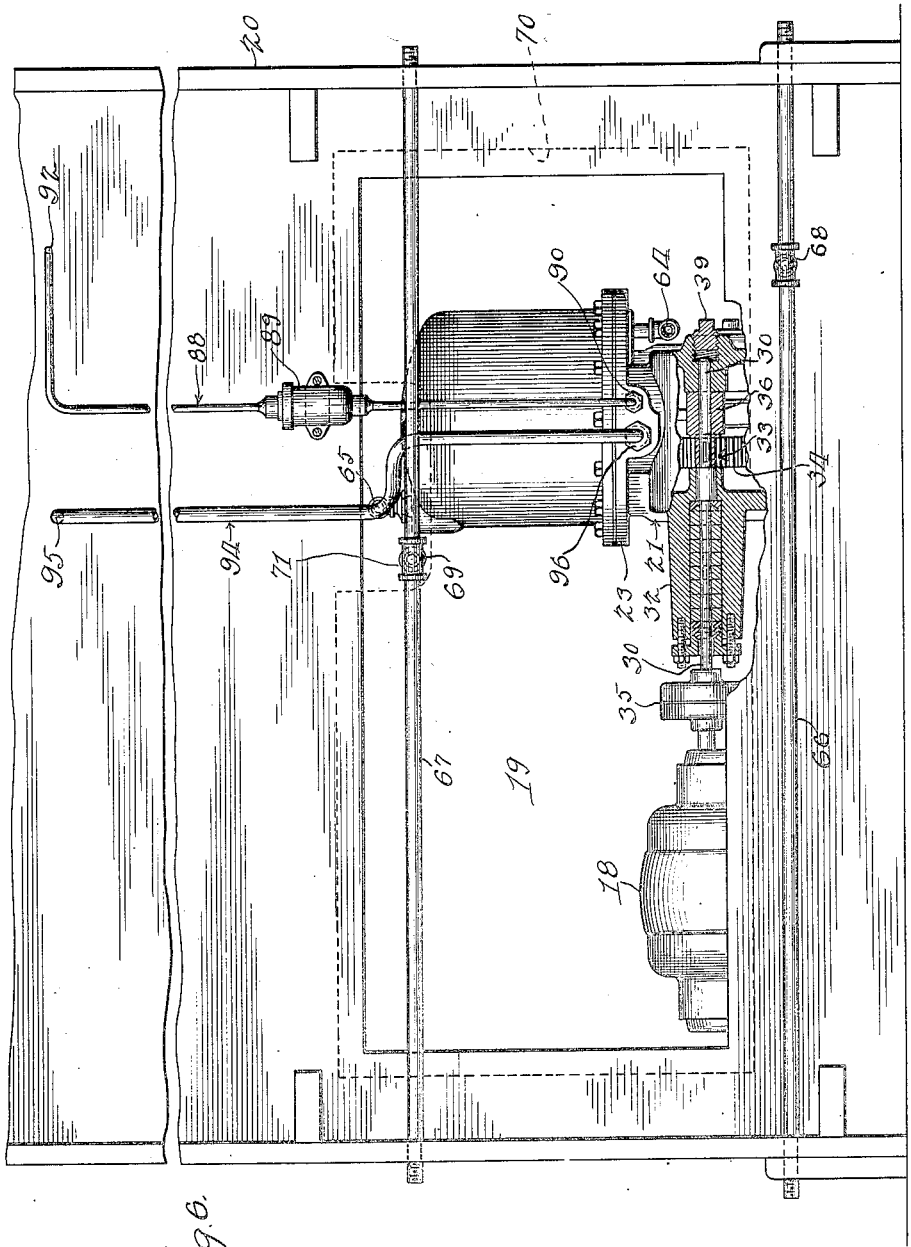

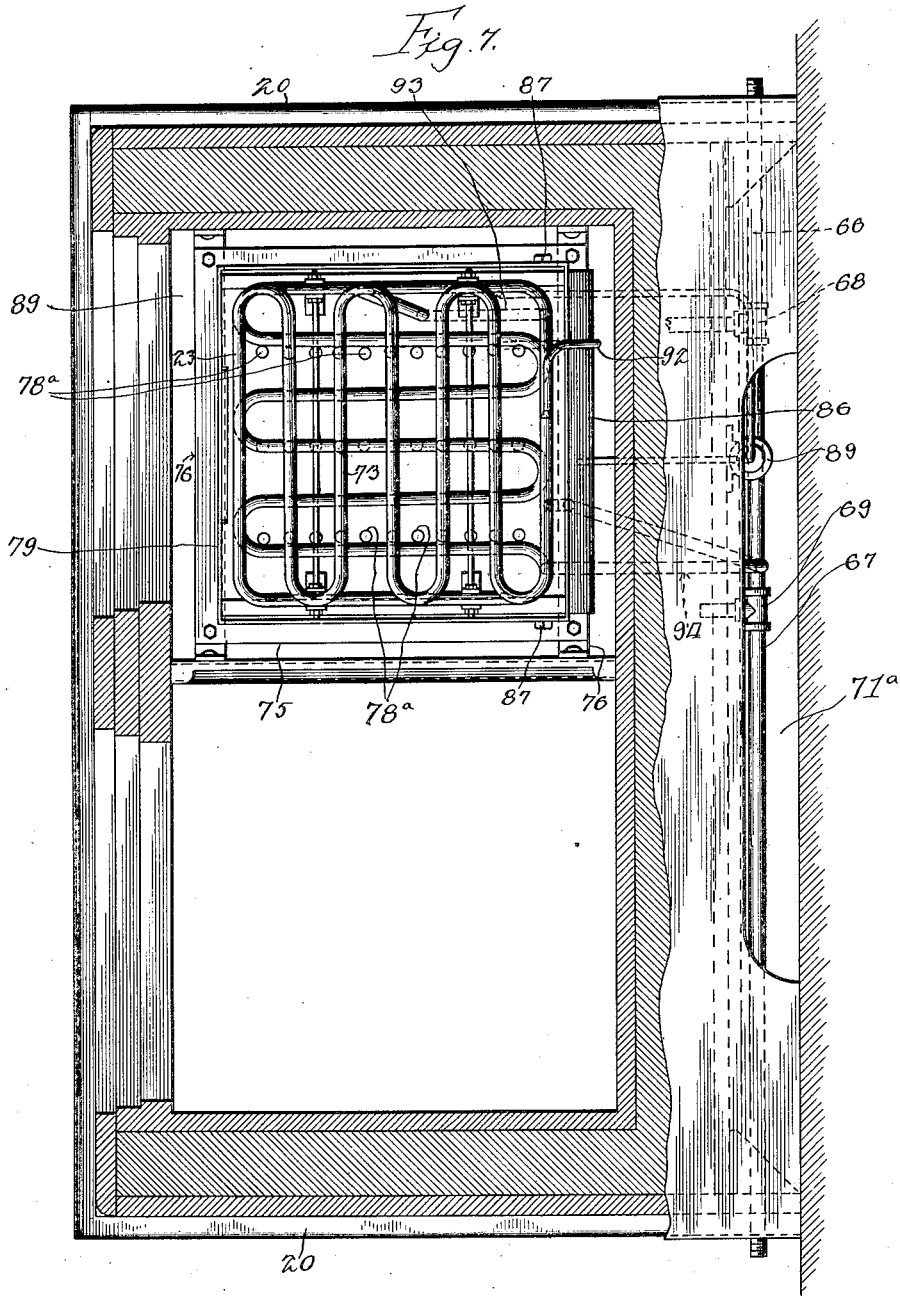

Oct. 14, 1924.
J. FRANKENBERG
1,511,405
DOMESTIC REFRIGERATING UNIT
Filed July 1, 1920      8 Sheets-Sheet 8
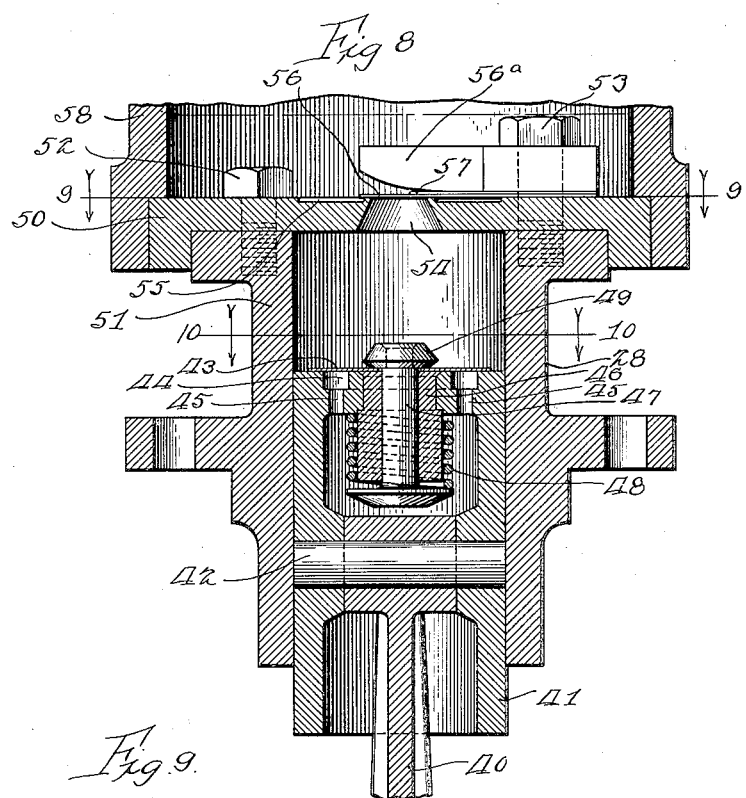
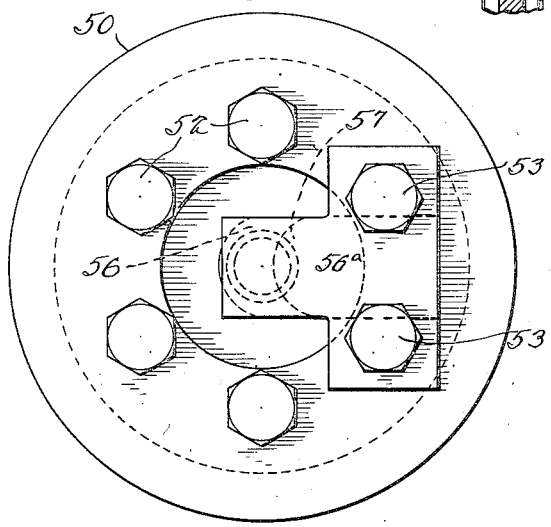
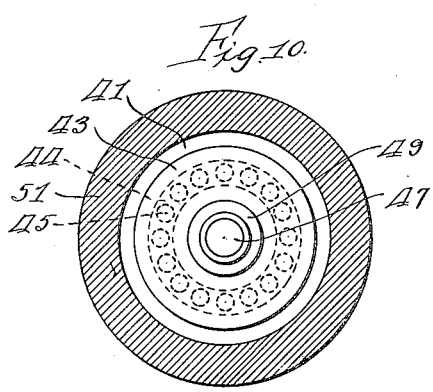
Inventor.
Julius Frankenberg Patented Oct. 14, 1924.

1,511,405

UNITED STATES PATENT OFFICE.

JULIUS FRANKENBERG, OF CHICAGO, ILLINOIS.

DOMESTIC REFRIGERATING UNIT.

Application filed July 1, 1920. Serial No. 393,390.

*To all whom it may concern:*

Be it known that I, JULIUS FRANKENBERG, a citizen of the United States, residing at Chicago, in the county of Cook and State of Illinois, have invented certain new and useful Improvements in a Domestic Refrigerating Unit, of which the following is a specification.

This invention relates to improvements in refrigerating apparatus of the compression type using sulphur dioxide or any other suitable substance for the refrigerating medium and it consists in the novel construction, combination, arrangement and operation of such elements and parts as are hereinafter described and pointed out in the appended claims.

The object of this invention is to provide a complete refrigerating unit, primarily intended for domestic use; one which employs a high speed one cylinder reciprocating gas compressor, thereby reducing its size to a minimum; one that employs special suction and discharge valves adapted for high speed, noiseless operation and affording maximum efficiency; one which employs a compressor stuffing box which at all times is gas or oil tight; one which employs a condenser of special design whereby the compressed gases are liquefied by a minimum amount of water; one which employs a system, whereby the suction gas is always returned to the crank case of the compressor in a slightly superheated state which is absolutely necessary for the safe and economical operation of a sulphur dioxide refrigerating machine; one which employs a system whereby cylinder, piston and drive mechanism operating within the crank case of the compressor are at all times copiously lubricated; one which employs a novel system for making small amounts of ice with certainty and economy; one which employs a refrigerator, wherein cool air currents are employed, caused by the natural draft to remove heat sufficiently from the compressor, condenser and electric motor.

Other objects and advantages of the invention will be disclosed in the subjoined specification and explanation.

In the accompanying drawings, which will serve to illustrate an embodiment of the invention—

Fig. 4 is a cross-sectional view partly in elevation taken on line 4—4 of Fig. 2 looking in the direction indicated by the arrows.

Fig. 5 is a similar view taken on line 5—5 of Fig. 3 looking in the direction indicated by the arrows.

Fig. 6 is a rear elevation of the lower part of the refrigerator.

Fig. 7 is a partial top plan view of the rear end of the refrigerator and a partial plan sectional view of the same through the ice chamber.

Fig. 8 is an enlarged vertical sectional view through the cylinder, piston and lower part of the discharge hood.

Fig. 9 is a top plan view of the cylinder head and discharge valve.

Fig. 10 is a plan sectional view taken on line 10—10 of Fig. 8 showing the cylinder and its suction valve, and Fig. 11 is an enlarged vertical sectional view through the discharging hood and its surrounding shell, showing the construction of the pocket of the former and the means of connecting the two in spaced relation.

Like numerals of reference refer to corresponding parts throughout the different views of the drawings.

Figure 1:
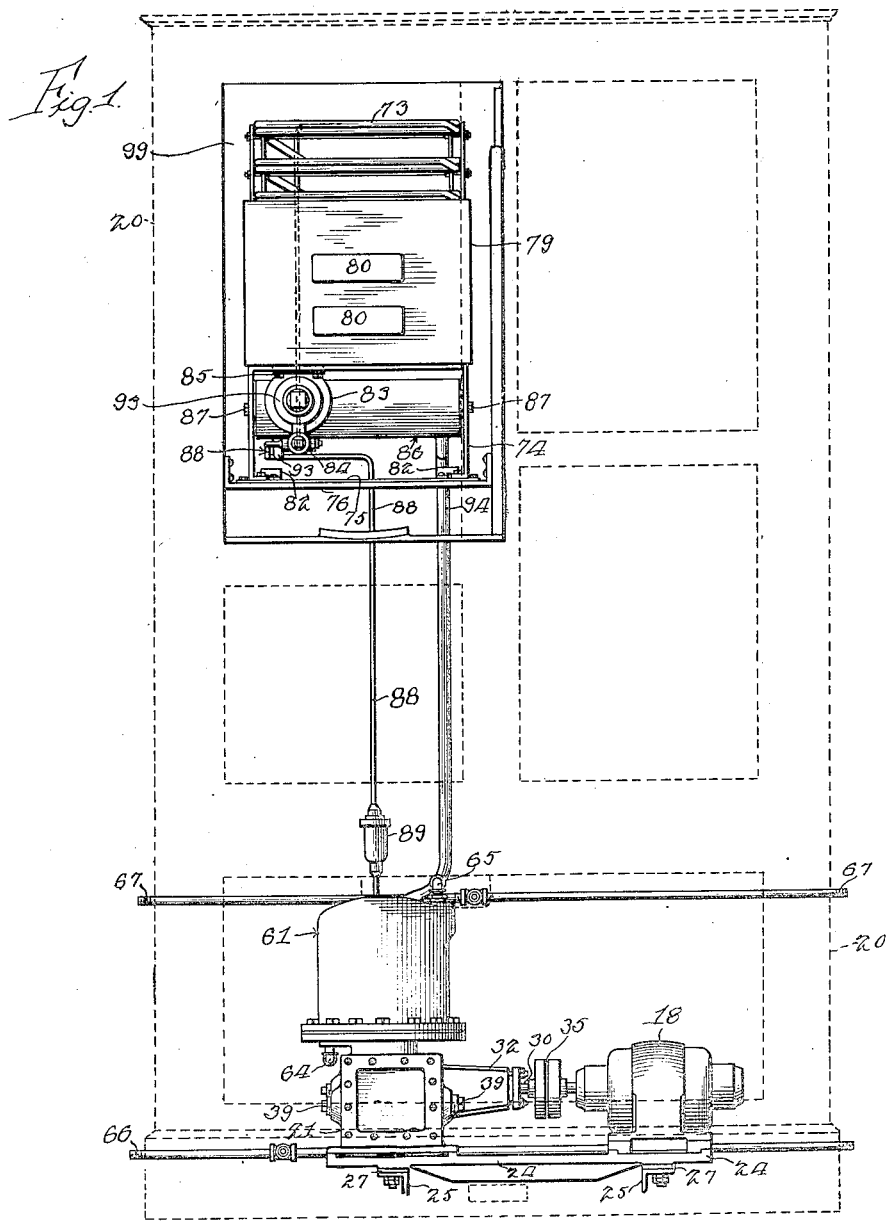
Fig. 1 represents the complete unit in front elevation showing it encased in a refrigerator casing, illustrated by dotted lines, and exhibiting the relative positions of the parts of the unit with reference to the compartments of said casing.

The reference numeral 20 designates a suitable household refrigerator casing, differing however, from the standard type, the lower part being provided with a compartment 19 wherein the machinery portion of the refrigerating apparatus is located. This compartment shall hereafter be referred to as "machine compartment." As is clearly shown in the drawings, particularly in Figs. 2, 4 and 6 thereof, the compressor is of the enclosed vertical single-acting type, and is principally composed of a crank case 21 to which the whole compressor and condenser mechanism is attached. Horizontally this crank case is mainly of rectangular cross-section, except at the top which is of circular cross-section ending in a circular flange 23.

The front of the crank case 21 is provided with a rectangular cover plate 22 to permit access to the mechanism contained therein. Both compressor and the electric motor 18, driving same are located upon a base plate 24 which in turn rests upon two angle iron bearing bars 25 fastened to the sides of the refrigerator casing by lag screws 26. Rubber pads 27 are interposed between the base plate 24 and bearing bars 25 to deaden any undue sound caused by the motor or compressor mechanism.

The compressor cylinder 51 is mounted concentrically and bolted to the upper flange of the crank case 21 by means of bolts 29, the lower half of the cylinder extending into the crank case and the upper half into the condenser space. The crank case further accommodates two parallel shafts 30 and 31 within suitable bearings forming part of said crank case. Upon the drive shaft 30, extending through the stuffing box 32 and connected to the motor shaft by suitable coupling 35, is rigidly mounted a pinion 33 which is in mesh with a driven gear 34, rigidly mounted upon the shaft 31. The enlarged part of the driving shaft 30 and collar 36 prevents said shaft moving laterally and the driven shaft 31 is kept in place by the large gear 34, eccentric 37 and collar 38 mounted upon the same. The openings in the crank case opposite the shaft bearings are tapped to receive pipe plugs 39 thus making gas tight joints.

Figure 2:
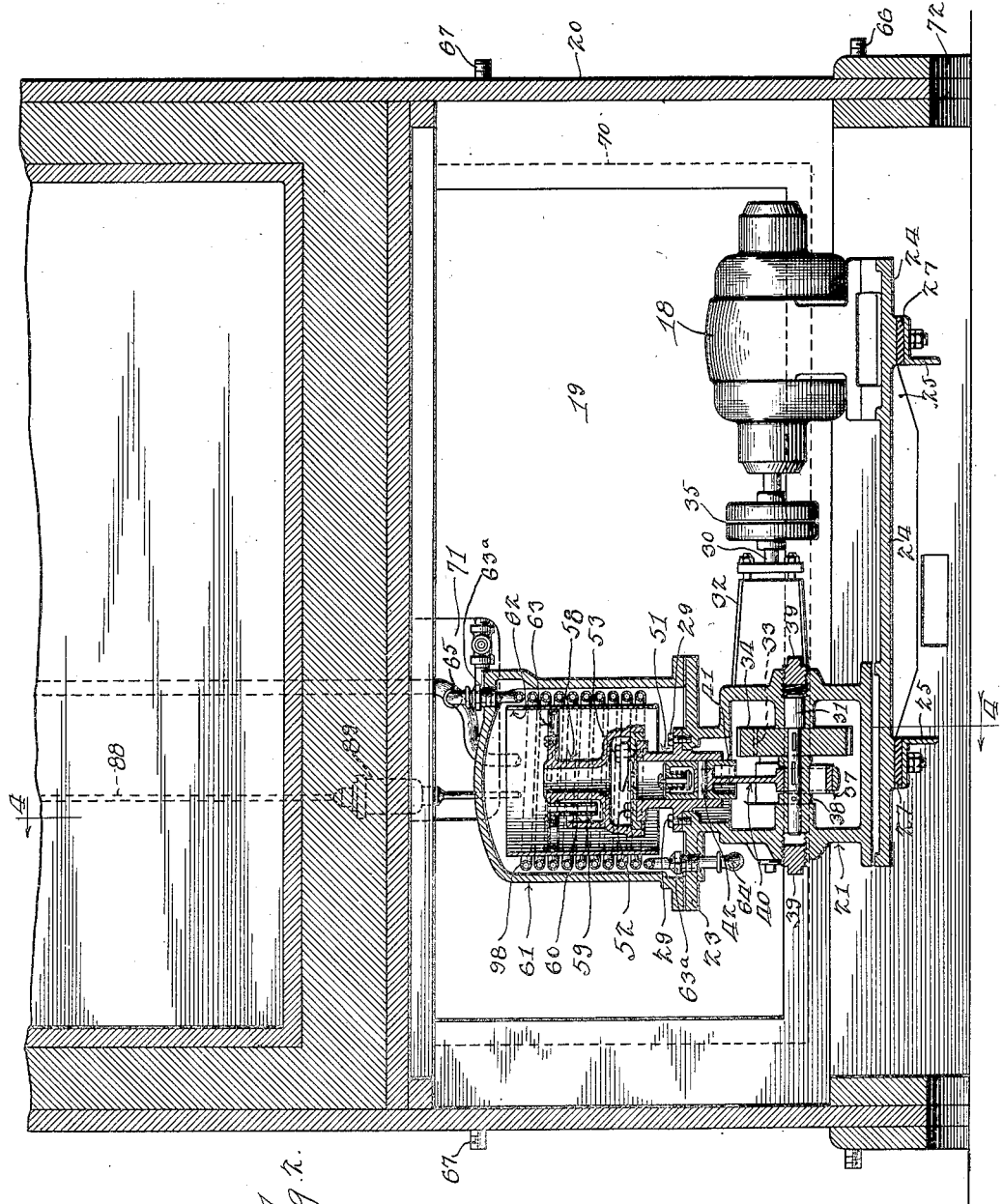
Fig. 2 is a vertical sectional view partly in elevation taken on line 2—2 of Fig. 4 looking in the direction indicated by the arrows.

The upper end of the eccentric rod 40 is pivotally mounted in the piston 41 by means of a piston pin 42. As shown by Fig. 2 and particularly Fig. 8, this piston is of the trunk type provided with a thin steel plate suction valve 43, nearly covering the whole of the top of the piston, the said top thus forming a seat for the suction valve. The suction valve ports are formed by an angular groove 44 and a suitable number of holes 45 communicating with said annular groove and the interior of the piston and crank case 21. The upper part of the piston is suitably provided with a guide 46 to receive the valve stem 47 which is enlarged at the lower end to support a spring 48. Upon the upper end of the stem 47 is loosely mounted the plate suction valve 43 and the same is held down to its seat normally by said spring 48 and a knob 49 which in turn is riveted to the valve stem 47. This knob 49 is slightly beveled next to the valve plate 43 to more readily allow the the same to assume a dished shape when discharge takes place, and is also beveled on top to fit in a correspondingly shaped discharge port or recess 54 of the cylinder head 50 for the purpose of reducing clearance space to a minimum.

The cylinder head 50 is dished out to fit over the upper flange of the cylinder 51, and is bolted to the same by means of screws 52 and 53. As is clearly shown in Fig. 8, a narrow concentric seat is formed in the top of the cylinder head by the port 54 and a concentric depression 55 for the discharge valve 56. This valve consists of an oblong thin and flexible steel plate, and is held in its proper relative position to the discharge port 54 by means of a curved guard 56ª which is bolted to the cylinder head by two screws 53. For purposes hereafter referred to, another thin flexible plate 57 is placed in a similar manner over the primary or main discharge valve, but extending only partly over the discharge port as shown. A discharge hood 58 is at its lower part permanently fitted over the cylinder head 50. This hood is mainly of circular cross section but has an open pocket 59 located on the side of it, see Figs. 2 and 11, into which extends partly the oil pipe 60 which is screwed into the upper flange of the discharge hood 58.

The cylindrical condenser shell 61 is bolted to the compressor flange 23 and made gas tight with same in the customary manner. A helical water coil 98 is placed within close proximity to the interior walls of the shell 61 and also in close proximity to a cylindrical sheet steel shell 62 extending throughout the whole length of the condensing coil. By means of an inner head 63 of the shell 62 and attached thereto, the shell 62 is concentrically located upon the upper flange of the discharge hood 58 and bolted thereto. Inlet and outlet connections for the coil 98 are provided in the flange 23 and the condenser shell 61 respectively by bushings 63ª to which the coil is soldered, thus making the condenser completely tight. Both ends of the coil have elbows 64 and 65 respectively, for water inlet and outlet and these are in turn connected by suitable means with T's 68 and 69, see Fig. 6, located in the inlet water header 66 and the outlet header 67, respectively.

As shown, particularly in Figs. 4, 5, 6 and 7, the sides of the refrigerator box or casing are extended in the rear throughout its entire height, without however changing its appearance from the ordinary design when placed in position against the wall of the room. In this space are located water headers, other pipe connections and apparatus, which would otherwise have to be placed in the rear wall of the box, making the proper insulating of such wall very difficult. The rear opening of the machine room is permanently covered by a cover plate 70, while the front is either provided with a suitable door or removable cover, not shown. An opening 71 is provided in the rear cover 70 also openings 72 in the lower ends of the sides of the refrigerator box, thus forming a natural air cooling device to remove heat from the electric motor and the compressor as will be explained further on.

Figure 3:
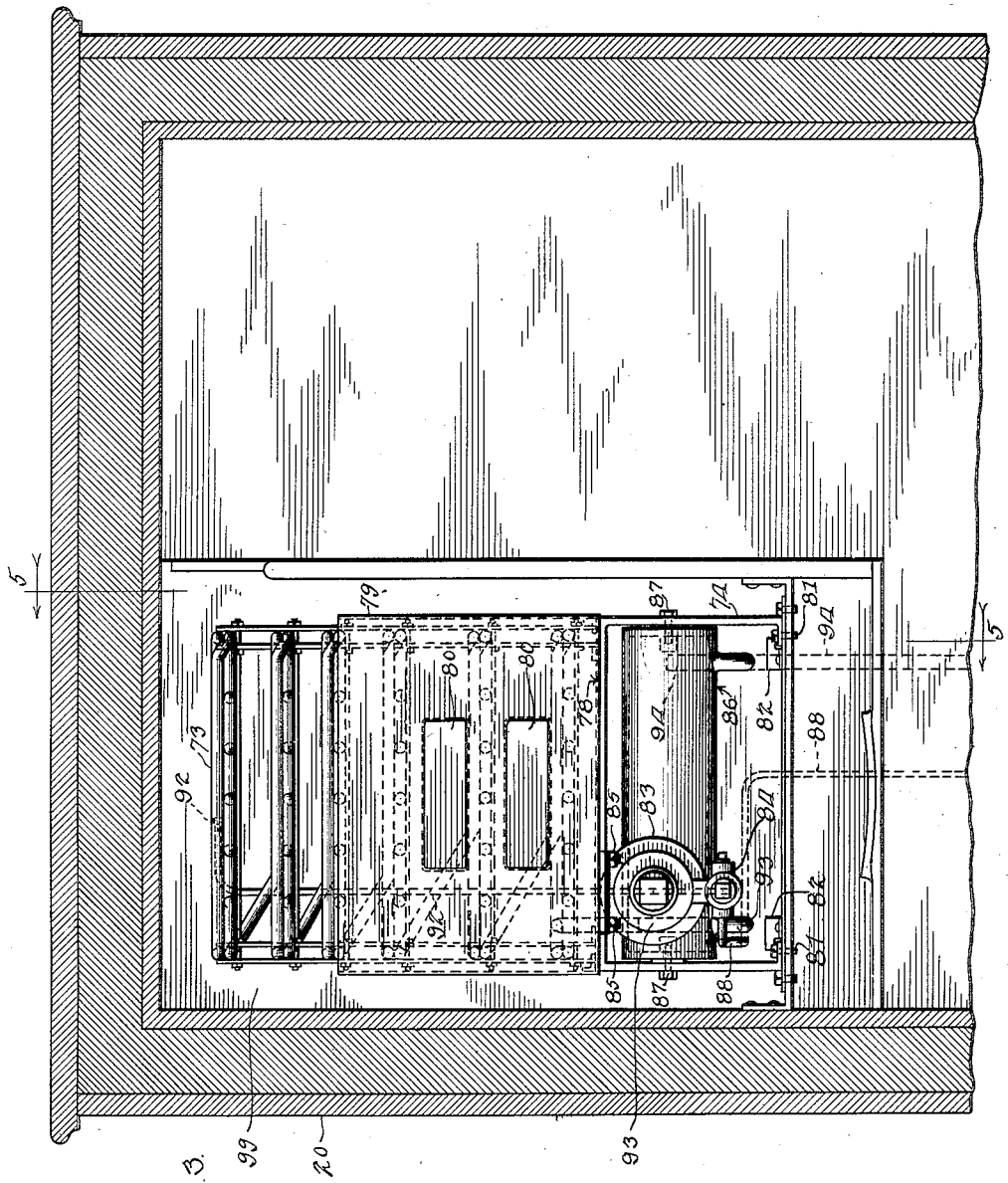
Fig. 3 is a similar view taken on line 3—3 of Fig. 5 as indicated by the arrows.

That space 99 in a refrigerator ordinarily filled with ice, is occupied in my device by an evaporator coil and accessories as clearly indicated in Figs. 3, 5 and 7. The evaporator coil 73 consists mainly of a series of parallel coils placed above each other, forming a continuous coil. The whole freezing apparatus rests upon two inverted U-shaped supports 74 which stand upon the base plate 75 and this plate is supported by two bearing bars 76 fastened securely to the sides of the walls of the freezing chamber 99. Clips 82 riveted to 75, fit over the lower bent portions of the rear stand 74 while bolts 81 secure the front stand 74 to the base plate 75, making it simple to install or remove said apparatus. The upper part of the evaporator coil is exposed to the circulating air currents, while the lower part is covered on all four sides by a sheet metal plate box 79 and at the bottom by a heavier perforated plate 78. To the under side of the plate 78 is bolted by screws 85 an expansion valve 83 with three way cock 84. Between the rear supports 74 and bolted thereto by screws 87 is suspended a pressure tight cylinder 86, hereafter to be designated as "an accumulator and liquid and oil separator combined." For the purpose of ice making, suitable ice cans 80 are placed in the two spaces formed by the lower three coils of the expansion coil.

A liquid pipe 88 communicates with the bottom of the condenser through the port 91 shown in Fig. 4, and is attached to the plug 90 which is screwed into the crank case shown in Fig. 6. The liquid pipe with scale trap 89 is then carried upwards and along the rear wall of the refrigerator and enters the same at the point 92, Fig. 6 making communicative connection with the expansion valve 83 through the three way cock 84 to which said liquid pipe is attached, as plainly shown in Fig. 3. The liquid pipe 92 is carried back of the expansion coil connecting with the expansion valve and entering the top of the expansion coil 73 as shown in Figs. 3, 5 and 7. The bottom outlet of the expansion coil continues into the larger pipe 93 and is carried through the bottom of the accumulator 86 and near its end into its interior almost reaching the top of the inside wall. The main suction pipe 94 leaves the accumulator at the opposite end and is also carried through the bottom of the same into its interior to a predetermined extent as plainly shown in Figs. 3 and 5. It then leaves the refrigerator at the point 95, see Fig. 6, and is carried downwards along the rear wall of the same and is attached to the bushing 96 which is screwed into the crank case, and thence continues as a port 97 thus establishing communication with the interior of the crank case.

The operation of this refrigerating unit is as follows: Rotative motion is imparted to shaft 30 and pinion 33 which imparts rotative motion through the driven gear 34 to the eccentric shaft 31. This eccentric 37 and rod 40 actuated by said shaft imparts the necessary travel to piston 41 in cylinder 51. It has been my aim in this design to get along with one cylinder only instead of two, to reduce the number of parts and the size of the machine to a minimum. To accomplish this result high speed operation must be resorted to, which however must also be economical as well as noiseless. In other words, special valve design as well as copious and automatic lubrication of all working parts is essential, which is accomplished by my device as follows:

The crank case is a little over half filled with suitable oil and since all the moving parts are within the crank case or in close vicinity thereof, there is no special trouble of obtaining thereby simple lubrication, especially as along with the oil splash the suction gases will assist in carrying with them or taking up a certain quantity of oil, which therefore must be restored again to the crank case space, and which is accomplished in my device hereinafter to be described.

The suction gas enters the crank case through the suction port 97, see Fig. 4. Assuming the piston is on its downward stroke, the valve stem 47 will at that instant remain slightly behind the down moving piston on account of its weight and consequent inertia, therefore offering slight or no resistance to the suction gases. The annular groove 44 fed by auxiliary ports 45 in the piston affords an unusually large suction port area, and it is therefore evident, that the suction valve 43 will begin to open at the very beginning of the stroke of the piston and may readily adjust itself to such varying conditions as may be expected in compressor operation. Should for instance a sudden charge of oil or liquid be encountered, the valve 43 will assume a dished shape, affording plenty of opening under these conditions. It is, however, at the low suction pressures and at the high rate of speed at which this compressor must be operated, where this "inertia plate piston valve" has produced an unusual degree of volumetric efficiency combined with noiseless operation to such a degree, that the same work is successfully done in one cylinder, where two cylinders of the same dimensions have been required heretofore.

The design of the feather discharge valve is well known to the art, but the means to make the same noiseless as employed by me are novel and very simple. In order to seat the valve 56 at the instant that the piston has completed its compression stroke, another steel plate 57 of suitable thickness is placed on top of the valve 56 but only partly covering the same as shown in Fig. 8. This latter plate acts as a supplementary spring, while the weight and the dimensions of the main discharge valve have not been changed, therefore maintaining all its previous advantages and efficiency, thereby effecting a quiet seating of the same.

Gas has now been discharged into the hood 58 and by its very shape will some oil separate and be precipitated upon the cylinder head to such an amount as to completely and at all times cover the discharge valve and therefore effectually sealing it. In other words, in this device, I have an oil sealed discharge valve, instead of one covered with liquid sulphur dioxide, or such other liquid refrigerant, which may be equivalent to the properties of sulphur dioxide and which is collected in the bottom of the shell condenser. The discharge gas now passes through the narrow neck of the discharge hood 58, thence passes through the narrow space formed by the inner shell 62 and outer shell 61, effectively separating and precipitating oil contained in the gases upon the surface formed by the upper flange of the discharge hood and inner head 63 of the shell 62. The pocket 59 will now serve as an oil seal for the oil pipe 60, in other words, only gas passes over the condenser coil 98, keeping it free from oil, therefore reducing water consumption and obtaining perfect liquefaction of the refrigerant. It is further evident that the gases by means of the inner shell 62 are brought in intimate contact with the condenser coil surfaces, obtaining results similarly known in the double pipe condenser.

Liquid and a small amount of oil now enters the small port 91 of the crank case and flows through the liquid pipe 88 and scale trap 89, to the expansion valve 83 thence through the pipe 92 to the top of the expansion coil 73. Due to a great number of windings and consequent pipe friction, the liquid $SO_2$ will slowly flow downwards through the coil 73 and a greater part of it will be evaporated. As plainly shown in Figs. 3, 4 and 5, gaseous as well as liquid $SO_2$ with a certain amount of oil must flow through the pipe 93 into the accumulator 86 and since this pipe is very close to the top of the same, liquid and oil will be thrown upon its wall where they will cling to it by adhesion, therefore effective separation of the gas from the liquid is effected. The gases will travel now through the accumulator at a slow rate of speed, and any remaining oil or liquid will be deposited in the same, before entering the inlet of the main suction pipe 94 at the opposite end of the accumulator. The height at which this inlet is located and the size of the accumulator are not arbitrary, but bear a definite relation to the delivery of slightly superheated gas to the compressor through the suction pipe 94. And this is of paramount importance in an $SO_2$ machine of any kind and is a well known fact to those familiar with this subject. The object of my top liquid feed, instead of the bottom feed, is now fully apparent, since I have not only obtained dry compression thereby, but I am able to maintain the oil in the crank case at a practically constant level in conjunction with the advantages obtained through my novel condenser design, above referred to. It is further clear that the expansion valve, as well as the accumulator with their pipe connections, present so much added cooling surface.

The combined method of cooling the refrigerator and the making of ice is as follows: The warm ascending air currents will primarily get in contact with the unexposed part of the expansion coil 73, which in this case is the coldest part of the coil. The temperature of the inside of the freezing box 79 is very low and is used for the making of ice in suitable ice cans 80, but the bottom of the box 79 i. e., plate 78 has a suitable number of holes 78ª, to utilize part of the descending cold air currents produced by the coil enveloped by the box 79 for refrigerating purposes. For this latter purpose, the walls of the box 79 itself are also utilized. The method of keeping the machine room at a reasonable temperature is evident: cool air currents enter the same through the openings 72, remove generated heat from the motor and compressor, thence pass through the opening 71 of the back cover 70 upwards through the flue 71ª formed by the extensions of the sides of the box, the rear wall of the box and the wall of the room against which the refrigerator has been placed.

To make such a unit of the character described entirely automatic in its operation, it is necessary to provide a suitable device, firstly, for the regulation of temperature of the refrigerator compartments, and, secondly, of a device controlling the condenser pressure, or in other words, the control over water supply flowing through the condenser coil. This apparatus I place in the machine compartment, and is of such suitable construction or design as is best suited for the above purpose.

While I have shown in the drawings the machine room or compartment 19 as being bottomless and with an opening 72 in the lower portion of each of the sides thereof, and while I prefer to so construct the refrigerator box, yet it is evident that said machine room or compartment may be provided with a floor or bottom and one or more openings located in the walls of the compartment just above the floor or when the bottom is omitted one opening only for the inlet of air may be used, it being understood that various changes in the form, proportions, size and minor details of the structure, so long as they come within the scope of the claims, may be made without departing from the spirit or sacrificing any advantages of the invention.

By experience, in the use of refrigerating units constructed according to my invention, I have found that much more satisfactory results have been obtained by employing a top feed expansion coil instead of a bottom feed coil, and for this reason, I have so illustrated and described such an arrangement in the unit, but should it be desirable, it is evident that a bottom feed accumulator may be employed without a departure from the spirit of the invention.

Having thus fully described my invention, what I claim as new and desire to secure by Letters Patent is—

1. In a device of the character described, a refrigerator box having the usual ice receiving compartment and food receiving compartments of the domestic type of such boxes and provided in its lower portion with an additional compartment, said additional compartment having an air inlet in its lower portion and an air outlet in its rear upper portion, said box having at its sides from the top to the bottom thereof rearward vertical extensions adapted to contact at their free edges with the vertical wall against which the box is to be placed, thereby forming a vertically disposed space co-extensive with the height of the box and in communication with the last named compartment.

2. In a device of the character described, a refrigerator box having the usual ice receiving compartment and food receiving compartments of the domestic type of such boxes and provided in its lower portion with an additional compartment having an air inlet, said box having at its sides rearward vertical extensions adapted to contact at their free edges with the vertical wall against which the box is to be placed thereby forming a vertically disposed space coinciding with the length of the box, said space having communication with said additional compartment.

3. A device of the character described, including in combination with a motor driven refrigerating apparatus, a box encompassing the same, said box having the usual ice receiving compartment and food receiving compartments of the domestic type of such boxes and provided in its lower portion with an additional compartment, a portion of said apparatus located in said additional compartment, another portion of said apparatus located in the usual ice receiving compartment, said box having at its sides rearward vertical extensions adapted to contact at their free edges with the vertical wall against which the box is to be placed, thereby forming a vertically disposed space, said space having communication with said additional compartment, pipe connections uniting the parts of the apparatus located in the said additional compartment and those located in said ice receiving compartment as well as other parts of the apparatus located in said vertically disposed space.

4. A device of the character described, including in combination with a motor driven refrigerating apparatus, a box encompassing the same, said box having the usual ice receiving compartment and food receiving compartments of the domestic type of such boxes and provided in its lower portion with an additional compartment for the reception of a portion of said apparatus, said lower compartment being bottomless and having at least one air inlet opening in its lower portion and an air outlet opening in the upper portion of its rear wall, said usual ice receiving compartment adapted for the reception of parts of said apparatus, said box having at its sides rearward vertical extensions adapted to contact at their free edges with the vertical wall against which the box is to be placed, thereby forming a vertically disposed flue for the passage of natural air currents from said additional compartment and a roomy space for the reception of pipe connections uniting the parts of the apparatus to be located in the said additional compartment and those to be located in said usual ice receiving compartment as well as the water headers and other parts of the apparatus.

5. In a device of the character described, the combination with a refrigerator box having compartments therein, of a motor driven fluid gas compressor, a condenser in operative communication with said compressor and both located in a compartment in the lower part of said box, a down feed non-flooded expansion coil located in a compartment of the box above the first named compartment, an accumulator connected with the expansion coil but below the latter, and an expansion valve located in said compartment.

6. In a device of the character described, the combination with a refrigerating box having compartments therein, of a compressor for suitable refrigerating gas, a condenser for liquefaction of compressed gases in communication with said compressor, both compressor and condenser located in a compartment in the lower part of said box, an expansion coil located in a compartment of the box above the last named compartment, an expansion valve operatively connected to the top inlet of said expansion coil, an accumulator located below the expansion coil and operatively connected with the bottom outlet of the expansion coil, said connection extended into the accumulator and terminating near the top wall thereof to separate oil and liquid dioxide from the dry gases, a suction pipe leading into the suction space of the compressor leaving the bottom of the accumulator at the opposite side from said connection but extended into the accumulator to a predetermined height for the purpose of separating oil from the accumulated liquid and to return the same to the crank case of the compressor for the purpose of keeping the oil in said case always at practically the same level.

7. In a device of the character described, the combination with a chamber to be refrigerated, of a down feed non-flooded expansion coil located in said chamber, a liquid feed connection communicating with the top of said expansion coil to permit oil or surplus unexpanded liquid to reach the bottom of the same by gravity, an accumulator located below said expansion coil, a compressor located below said expansion coil and accumulator, means to operate the compressor, a condenser and liquid receiver in conjunction with said compressor, suitable means to establish communication between said expansion coil, accumulator and the suction side or crank case of the compressor for the purpose of returning all oil to said suction side or crank case of the compressor by gravity, means provided within said accumulator for the separation of the suction gas from entrained liquid and oil, all for the purpose set forth and for the production of dry compression.

8. In a device of the class described, a compressor, a hood to receive fluid from said compressor, an inner shell open at its upper end surrounding said hood, a head in said inner shell below the discharge end of said hood, a pocket on said hood below said head, a tube flush at one end with the upper surface of said head and projecting into said pocket, an outer shell enclosing said inner shell and spaced therefrom, and a liquid coil in the space between said inner and outer shells.

9. In a device of the character described, the combination with a refrigerator box having therein a cooling chamber or compartment, of a freezing box having a perforated bottom in said compartment, a down feed expansion coil located entirely in said compartment and supported thereby but having a plurality of coils extended above said freezing box, and means to supply a suitable refrigerant to the top of the expansion coil.

10. In a device of the character described, the combination with a refrigerator box having therein a cooling chamber or compartment, of an open top freezing box located therein, a down feed direct expansion coil within said box and supported by the bottom of the same and having a portion extended above said box, coils of the expansion coil within the box being located in horizontal planes one above the other, one of the walls of said freezing box having therein at least one opening, and a water container inserted through said opening between a pair of said coils.

11. In a device of the character described, the combination with a refrigerator box having a cooling chamber or compartment therein, of a base plate horizontally located in said compartment near its lower end, of a pair of substantially inverted U-shaped supporting members mounted in upright positions on the front and rear portions of the base plate and each having its lower end provided with an inward extension, a clip fastened to said base plate and engaging each of the inwardly bent portions of the rear supporting member and a bolt securing each of the inwardly bent portions of the front supporting member to said base, an open top non-insulated freezing box mounted on the upper portions of said supporting members, and a direct expansion coil located in said freezing box and supported by the bottom of the same but extended above the top of the box to a suitable distance.

12. In a device of the character described, the combination with a refrigerator box having therein a cooling compartment or chamber with a doorway leading therefrom, a base plate located near the bottom of said chamber and about level with the sill of the doorway, an open top freezing box located in said chamber, an expansion coil located in said freezing box but having a portion thereof extended above the top of said box, upright supports for said freezing box and the expansion coil carried thereby detachably mounted on said base plate whereby the bottom of the freezing box will be located a suitable distance above said plate.

13. In a device of the class described, a compressor casing, an outer shell enclosing one side of said casing, a cylinder extending from said casing into the compartment formed by said shell, an inner shell within the first named shell spaced from the latter and enclosing the adjacent end of said cylinder, a coil in the space between said inner and outer shells, and means for compelling fluid from said cylinder to take a definite course through the said space.

14. In a device of the character described, the combination with a motor, of a single acting vertical enclosed fluid gas compressor comprising a housing provided with a flange at the upper portion thereof, a compressor cylinder concentrically mounted in said flange and extended above and below the same, a trunk piston operatively located in said cylinder, drive mechanism located in said housing and operatively connected to the piston and motor, a hollow cylindrical condenser shell closed at its top and made gas tight with the flange of the compressor housing, a discharge hood encompassing the upper portion of the compressor cylinder and fixed thereto, said hood being of smaller cross-section in its upper portion than at its bottom, a water cooling coil spaced near the inside wall of the said condenser shell and having the water inlet end thereof projecting through and made gas tight with the flange of the compressor housing and having the water outlet at the end of the coil projecting through and made gas tight with the top of the condenser shell, a cylindrical shell located within said coil and closely spaced therefrom, said shell extending beyond the top and bottom of the water coil thereby forming a narrow passage for the discharge gases and forcing said gases into intimate contact with the walls of the water coil for producing a maximum amount of liquefaction with a minimum amount of coil surface.

15. In a device of the character described, the combination with a motor, of a single acting vertical enclosed fluid gas compressor comprising a housing provided with a flange at the upper portion thereof, a compressor cylinder concentrically mounted in said flange and extended above and below the same, a trunk piston operatively located in said cylinder, drive mechanism located in said housing and operatively connected to the piston and motor, a hollow cylindrical condenser shell closed at its top and made gas tight with the flange of the compressor housing, a discharge hood encompassing the upper portion of the compressor cylinder and fixed thereto, said hood being of smaller cross-section in its upper portion than at its bottom, and having an external annular flange on its upper part, a water cooling coil spaced near the inside wall of the said condenser shell and having the water inlet end thereof projecting through and made gas tight with the flange of the compressor housing and having the water outlet at the end of the coil projecting through and made gas tight with the top of the condenser gas tight with the top of the condenser shell, a cylindrical shell located within said coil and closely spaced therefrom, an internal flange on the upper portion of the last named shell and secured to the flange of the hood, said shell extending beyond the top and bottom of the water coil thereby forming a narrow passage for the discharge gases and forcing said gases into intimate contact with the walls of the water coil for producing a maximum amount of liquefaction with a minimum amount of coil surface.

16. In a device of the character described, the combination with a motor, of a single acting vertical enclosed fluid gas compressor comprising a housing provided with a flange at the upper portion thereof, a compressor cylinder concentrically mounted in said flange and extending above and below the same, a trunk piston operatively located in said cylinder, drive mechanism located in said housing and operatively connected to the piston and motor, a hollow cylindrical condenser shell closed at its top and made gas tight with the flange of the compressor housing, a discharge hood encompassing the upper portion of the compressor cylinder and fixed thereto, said hood being of smaller cross-section in its upper portion than at its bottom, a water cooling coil spaced near the inside wall of the said condenser shell and having the water inlet end thereof projecting through and made gas tight with the flange of the compressor housing and having the water outlet at the end of the coil projecting through and made gas tight with the top of the condenser shell, a cylindrical shell located within said coil and closely spaced therefrom, means interposed between the upper portion of said shell and the upper end of said hood to close the space therebetween, said shell extending beyond the top and bottom of the water coil thereby forming a narrow passage for the discharge gases and forcing said gases into intimate contact with the walls of the water coil for producing a maximum amount of liquefaction with a minimum amount of coil surface.

17. In a device of the character described, the combination with a fluid gas compressor having at the top thereof an annular flange, an inner shell mounted above said flange, an outer shell mounted on said flange and enclosing the inner one, said outer shell havig its upper end closed and located near the upper end of the inner shell to form an oil separator, a water coil interposed between the inner and outer shells and in close proximity thereto, a discharge hood mounted on the compressor cylinder, a closure between the top of the hood and the inner shell at a distance below the top edge of said shell, said hood provided with a vertically disposed pocket below said closure to form an oil trap, and a drain pipe extended through an opening in said closure and into said pocket.

18. A device of the character described, including in combination with a motor, an enclosed type fluid gas compressor comprising a cylinder, a piston located in said cylinder and operatively connected to the motor, and a housing for the lower portion of the cylinder having at its upper portion an annular flange, an inner shell located around the upper portion of the compressor cylinder but spaced from said flange, an outer shell mounted on said flange and enclosing the inner one, said outer shell having its upper end closed and located near the upper end of the inner shell to form an oil separator, a water coil interposed between the inner and outer shell and located in close proximity thereto, a discharge hood mounted on the compressor cylinder and provided with an external annular flange at a distance below the top edge of the inner shell, an internal head or flange on the inner shell secured to the flange of the hood, said hood provided with a vertically disposed pocket below the flange thereof to form an oil trap, and a drain pipe extended through an opening in the last named flange and into said pocket.

19. In a device of the character described, the combination with a motor driven compressor, of a suitably supported top feed expansion coil, an accumulator mounted below said coil, a pipe leading from the bottom of said coil and extended into the accumulator near one end thereof to a point near its top wall, and another pipe leading from the compressor and extended into the accumulator near the other end thereof to a predetermined height but below the end of the first named pipe.

20. In a device of the character described, the combination with a motor driven compressor, of a suitably supported top feed expansion coil, an accumulator mounted below said coil, a pipe leading from the bottom of said coil and extended upwardly into the accumulator near one end thereof to a point near its top wall, and another pipe leading from the compressor and extended upwardly into the accumulator near the other end thereof to a predetermined height but below the end of the first named pipe.

21. In a device of the character described, the combination with a motor driven compressor, of a suitably supported expansion coil, an accumulator mounted below said coil, a pipe leading from the bottom of said coil and extended into the accumulator near one end thereof to a point near its top wall, and another pipe leading from the compressor and extended into the accumulator near the other end thereof to a predetermined height, but below the end of the first named pipe.

JULIUS FRANKENBERG.